3,250,760
PROCESS FOR THE MANUFACTURE OF PEPTIDE HYDRAZIDES

Max Brenner, Riehen, Switzerland, assignor to Ciba Corporation, New York, N.Y., a corporation of Delaware
No Drawing. Filed Oct. 10, 1962, Ser. No. 229,755
Claims priority, application Switzerland, July 28, 1960, 8,630/60; Oct. 17, 1961, 12,009/61; Oct. 20, 1961, 12,204/61
14 Claims. (Cl. 260—112.5)

This application is a continuation-in-part of my copending application Serial No. 123,642, filed July 13, 1961.

This invention relates to a new process for the preparation of peptide derivatives which are suitable for the synthesis of α-peptides, especially peptides which are formed from natural α-amino acids, namely peptide hydrazides and their derivatives with protected functional (amino, hydroxyl, mercapto and carboxyl) groups and their acid addition salts.

Hydrazides of amino acids and peptides are still of great importance today as intermediate products in peptide synthesis, since they permit the synthesis to be carried out under very mild conditions.

It has now been surprisingly found that it is possible to produce the hydrazides of peptides in a simple manner and in excellent yield by means of a rearrangement reaction from N-α-aminoacyl-N'-α-aminoacyl hydrazines having at least one free amino group. The second α-aminoacyl radical may be substituted by further α-aminoacyl radicals, that is to say it may be a peptidyl radical. The α-aminoacyl radicals are especially radicals of natural α-amino acids. Such α-amino acids are for instance glycine, alanine valine, lysine, ornithine, arginine, aspartic acid, glutamic acid, asparagine, glutamine, serine, threonine, cysteine, methionine, proline, oxy-proline, histidine, and other acids of the general formula

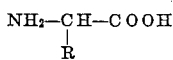

wherein R is hydrogen, lower alkyl, amino-lower alkyl, guanidino-lower alkyl, carboxy-lower alkyl, carbonamido-lower alkyl, hydroxy-lower alkyl, mercapto-lower alkyl, phenyl-lower alkyl, p-hydroxyphenyl-lower alkyl, dihydroxyphenyl-lower alkyl, lower alkyl being a straight or branched chain having from 1 to 5 carbon atoms, a functional group in R being preferably in ω-position. The α-amino acids are in the L-, D-, or D,L-form.

The rearrangement is effected by means of an acid substance, more specifically an organic or inorganic oxygen acid or acid salts or derivatives, especially acid esters thereof, and polycondensates containing acid groups. The inorganic acids derive from sulfur, silicium, and particularly from phosphor; the organic acids are carboxylic or sulfonic acids. The acid esters are formed from inorganic acids and alcohols or phenols in such a way that not all hydroxy groups of the acids are esterified. Particularly useful are monoesters and diesters of phosphoric acid and phosphorous acid, e.g. acid cellulose-phosphates, glycerin-α- and β-phosphate and resins containing phosphoric or phosphorous acid groups, for instance the phosphorous acid resin Duolite C–62, the phosphonic acid resin Duolite C–63 and the phosphoric acid resin Duolite C–65 of Chemical Process Co.

Polycondensates containing weakly acidic groups are especially ion exchangers in the H-form containing carboxyl or phenol groups, more especially those of the acrylic acid and phenol type, for example Amberlite CG–50, Amberlite IRC–50, Zerolit 216 and 226, Duolite CS–100 and CS–101, Permutit H and H–70, Wofatit CN and CP–300, Lewatit CNO, Imac C–19, carboxymethyl-cellulose and polyacrylic acid.

The rearrangement takes place under especially mild conditions if it is effected by means of an organic acid which does not form isolatable salts with diacyl hydrazine and whose pK is preferably greater than 2, for example formic acid, propionic acid, butyric acid, stearic acid, pivalic acid, lactic acid, glycollic acid, malonic acid, fumaric acid, maleic acid, succinic acid, ethoxyacetic acid, benzoic acid, naphthoic acid, phenylacetic acid, phenoxyacetic acid, cinnamic acid, pisolinic acid, phenol, preferably glacial acetic acid. The reaction is carried out in the presence of an inert organic solvent which is liquid at reaction temperature, for example an acid amide, such as N-acetyl-morpholine, dimethylformamide, dimethylacetamide, tetramethylurea, an ether, such as tetrahydrofuran, dioxane, dimethoxyethane, an ester, such as carbonic acid diethyl ester, a base, such as pyridine, piperidine, or mixtures of these solvents. The volume ratio of solvent to acidic substance is preferably 95–80%:5–20%.

The rearrangement is illustrated by the following diagram:

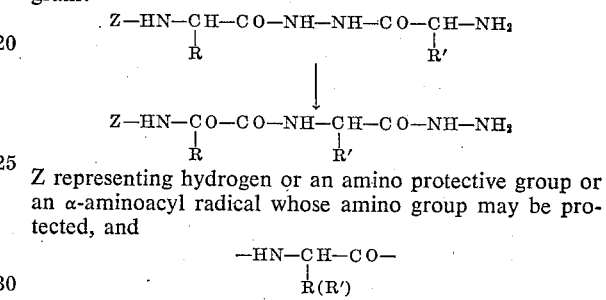

Z representing hydrogen or an amino protective group or an α-aminoacyl radical whose amino group may be protected, and $$-HN-CH-CO-$$
$$\quad\quad\quad|$$
$$\quad\quad\quad R(R')$$

the radical of an α-amino acid.

Amino protective groups are those which are used in the peptide field for the temporary blocking of amino groups, especially groups that can readily be split off by hydrolysis or hydrogenolysis, for instance carbobenzoxy or substituted carbobenzoxy, e.g. p-phenylazo-carbobenzoxy, p - (p'-methoxy-phenylazo)-carbobenzoxy; tertiary-butyloxy carbonyl, tosyl, trityl. Other functional groups not participating in the reaction, for instance free hydroxyl and carboxyl groups are also protected in known manner, the carboxyl group for example by esterifying it with a lower alkanol, e.g. methanol, tertiary butanol, or with benzyl alcohol or substituted benzyl alcohol, e.g. p-nitro-benzyl alcohol, the hydroxy group by esterifying it with a lower alkanoic acid, e.g. acetic acid.

The N-α-amino-N'-α-aminoacyl-hydrazines used as starting materials may be prepared by a new process in a very smoothly running reaction by reacting hydrazine or an amino acid or a peptide hydrazide with an amino acid-N-carboxy anhydride. This reaction is also carried out under mild conditions. It is advantageously performed in the presence of a carboxylic acid, particularly an acid having a pK value of 3.7 to 5.7, for example propionic acid, butyric acid, benzoic acid, naphthoic acid, and especially acetic acid, if desired in the presence of an inert organic solvent, such as dimethylformamide, chloroform, dioxane, tetrahydrofuran, ether, ethyl acetate, at room temperature; when the (solid) N-carboxy anhydride is added to the solution of the hydrazide or hydrazine, evolution of carbon dioxide occurs immediately, and the reaction is completed in a short time. When equimolecular quantities of the starting materials are used, the yield is quantitative. The reaction takes place, for example, according to the following equation:

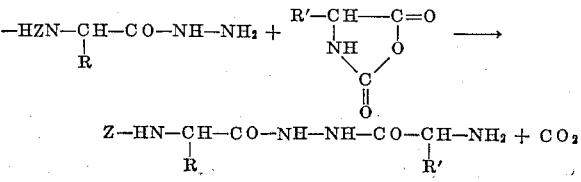

Z representing hydrogen or an amino protective group or an aminoacyl radical which may contain a protected amino group, and

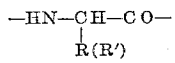

the radical of an amino acid. The solution of N-α-aminoacyl-N'-α-aminoacylhydrazine (with 2 free or 1 protected α-amino group) obtained can be used directly for the rearrangement reaction. If desired, the N-α-aminoacyl-N'-α-aminoacylhydrazine may be isolated. To this end, it is first preferably converted into an acid addition salt, for example the hydrochloride, hydrobromide or trifluoroacetate, by adding the acid in question to the solution. After the solvent has been evaporated, the salt of the N-α-aminoacyl-N'-α-aminoacylhydrazine is obtained in a yield of more than 90%. To carry out the rearrangement the salt is first converted into the free base.

It is a special advantage that the N-α-aminoacyl-N'-α-aminoacylhydrazines used as starting materials need not be isolated but may be rearranged directly to the peptide hydrazides. The peptide hydrazides obtained as products of the process may thus be used as starting materials for a continued synthesis according to the same process by adding on a further amino acid each time. Polypeptides may thus be prepared in steps from amino acids or simple peptides by adding on an amino acid each time. Alternatively, the peptide hydrazides obtained as products of the process may be used as starting materials in the known peptide synthesis according to Curtius (conversion into azides).

The process in which the N-α-aminoacyl-N'-α-aminoacylhydrazines are not isolated is carried out, for example, as follows:

1 gram of α-amino acid or peptide hydrazide with a protected amino group is dissolved at room temperature in 15 to 20 cc. of glacial acetic acid and 1 equivalent of α-amino acid-carboxy anhydride in solid form is added to the solution. When the evolution of carbon dioxide has subsided (about 5 minutes), which is best ascertained at a water-jet vacuum, N-protected, N-α-aminoacyl-N'-α-aminoacyl-hydrazine, dissolved in glacial acetic acid, is obtained. Dioxane is then added to the solution until the volume ratio of dioxane:glacial acetic acid is about 9:1. The solution is then allowed to stand at 20°, 38° or 60° C. depending on the reactivity of the starting materials used, until the ninhydrin test is negative and the Tollens' test positive. After the solution has been evaporated at 40° C. under reduced pressure, the rearrangement product is obtained which is recrystallized.

The process is illustrated in the diagram below which shows the preparation of carbobenzoxy-glycyl-glycyl-phenyl-alanine-hydrazide by way of example:

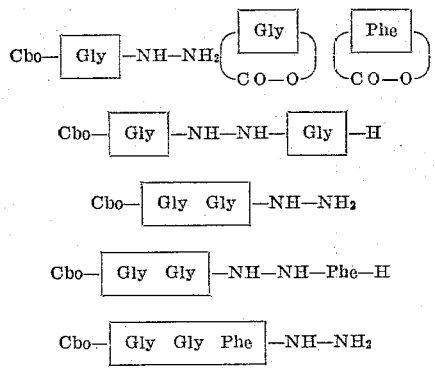

Cbo represents a carbobenzoxy radical.

The N-carboxyanhydrides may be prepared in a manner known per se, for example by reacting the amino acid with phosgene. During the reactions, functional groups which do not participate in the reaction, in particular the α-amino group of the amino acid hydrazide or peptide hydrazide, and, if required, any other amino, hydroxyl or mercapto groups present or a second carboxyl group, are advantageously protected in known manner, in particular by means of radicals which can be split off easily by hydrolysis, solvolysis or reduction; a free carboxyl or hydroxyl group, for example, by esterification or etherification, the mercapto group by the benzyl group, the amino group by the carbobenzoxy group, the tosyl group, the tertiary butyloxycarbonyl radical, the trifluoroacetyl radical or other acyl radicals known as protective groups. If the hydrazide of a peptide is used as starting material, it is also possible to employ the trityl radical with advantage.

From the resulting peptide hydrazide derivatives, if desired after conversion into azides and reaction with an amino acid or a peptide, the protective groups may be eliminated in known manner by hydrolysis, solvolysis or reduction.

Depending on the method of working, the new compounds are obtained in the form of bases or their acid addition salts. From the salts the bases can be obtained in a manner known per se. From the latter, in turn, salts can be obtained by reaction with acids which are suitable for forming therapeutically useful salts, such, for example, as salts with inorganic acids, such as a hydrohalic acid, for example hydrochloric acid or hydrobromic acid, nitric acid, thiocyanic acid, sulfuric acid, phosphoric acid, or with organic acids, such as acetic acid, propionic acid, glycollic acid, lactic acid, pyruvic acid, oxalic acid, malonic acid, succinic acid, maleic acid, fumaric acid, tartaric acid, citric acid, benzoic acid, cinnamic acid, salicylic acid, 2-phenoxy- or 2-acetoxy-benzoic acid, mandelic acid, methane-sulfonic acid, ethanesulfonic acid, hydroxyethanesulfonic acid, benzenesulfonic or toluenesulfonic acid.

The following examples illustrate the invention:

EXAMPLE 1

*Carbobenzoxyglycyl-D:L-phenylalanine hydrazide*

302 mg. of carbobenzoxyglycine hydrazide are dissolved in 5 cc. of glacial acetic acid and 258 mg. of D:L-phenylalanine-N-carboxyanhydride in solid form are added. After 10 minutes, 45 cc. of dioxane are added, the mixture is allowed to stand for 14 hours at 38° C. and is evaporated under reduced pressure at 40° C. The crude carbobenzoxyglycyl-D:L-phenylalanine hydrazide is obtained in quantitative yield. After recrystallization from methanol, the compound melts at 170° C.

In an analogous manner, starting from carbobenzoxyglycine hydrazide and D-phenylalanine-N-carboxyanhydride, carbobenzoxyglycyl-D-phenyl-alanine hydrazide having a melting point of 143–144° (sintering at 109) is obtained; starting from carbobenzoxyglycine hydrazide and glycine - N - carboxyanhydride, carbobenzoxyglycyl-glycine hydrazide melting at 162° C. is obtained; starting from carbobenzoxyglycine hydrazide and D-leucine-carboxyanhydride, carbobenzoxy-glycyl-D-leucine hydrazide melting at 130° C. is obtained; starting from carbobenzoxy-L-valine hydrazide and L-tyrosine-carboxyanhydride, carbobenzoxy-L-valyl-L-tyrosine hydrazide melting at 239–241° C. optical rotation $[\alpha]_D^{22}=-13.4° \pm 0.5°$ (c.= 2.1 in dimethylformamide) is obtained; starting from carbobenzoxy-L-phenylalanine hydrazide and D-valine-N-carboxyanhydride, carbobenzoxy - L - phenylalanyl-D-valine hydrazide is obtained; starting from carbobenzoxy-D-valine hydrazide and D-valine-N-carboxyanhydride, carbobenzoxy-D-valyl-D-valine hydrazide melting at 210° C. is obtained; starting from carbobenzoxy-D-alanine hydrazide and D-valine-N-carboxyanhydride, carbobenzoxy-D-alanyl-D-valine hydrazide is obtained; starting from carbobenzoxy-D-valine hydrazide and L-phenylalanine-N-carboxyanhydride, carbobenzoxy - D - valyl-L-phenylalanine hydrazide is obtained; starting from carbobenzoxyglycine hydrazide and D-valine-N-carboxyanhydride, carbobenzoxy-glycyl-D-valine hydrazide is obtained; starting from tosyl-glycine hydrazide and L-phenylalanine-N-carboxyanhydride, tosyl-glycyl-L-phenylalanine hydrazide is obtained; starting from tosyl-glycine hydrazide and D-valine-N-carboxyanhydride, tosyl-glycyl-D-valine hydrazide is obtained; starting from benzoyl-glycine hydrazide and glycine-N-carboxyanhydride, benzoyl-glycyl-glycine hydrazide melting at 225 to 227° C. is obtained; starting from benzoyl-glycine hydrazide and D:L-phenylalanine-N-carboxyanhydride, benzoyl - glycyl-D:L-phenyl-alanine hydrazide melting at 182–183° C. is obtained; starting from benzoyl-glycine hydrazide and D-phenyl-alanine-N-carboxyanhydride, benzoyl-glycyl-D-phenyl-alanine hydrazide melting at 211° C. is obtained; starting from benzoyl-glycyl-glycine hydrazide and D:L-phenylalanine-N-carboxyanhydride, benzoylglycyl - glycyl-D:L-phenylalanine hydrazide is obtained; and starting from benzoyl-glycine hydrazide and D-alanine-N-carboxyanhydride, benzoyl-glycyl-D-alanine hydrazide is obtained.

EXAMPLE 2

*Carbobenzoxy-glycyl-glycyl-D:L-phenylalanine hydrazide*

1.400 grams (5 millimols) of carbobenzoxyglycyl-glycine hydrazide are dissolved in 17.5 cc. of glacial acetic acid and 0.955 gram (5 millimols) of D:L-phenylalanine-carboxyanhydride is added with stirring. After 10 minutes, the reaction mixture is diluted with 200 cc. of dioxane and allowed to stand for 8 hours at 40° C. The solution is evaporated and the solid residue recrystallized from methanol with the addition of ether. There are obtained 1.900 grams (89% of the theory) of carbobenzoxyglycylglycyl-D:L-phenylalanine hydrazide melting at 201 to 203° C. When the product is recrystallized once more from ethanol the melting point is 206–207° C.

EXAMPLE 3

*Carbobenzoxyglycyl-D-phenylalanine hydrazide*

(A) N-CARBOBENZOXYGLYCYL-N'-D-PHENYLALANYL-HYDRAZINE TRIFLUOROACETATE 1.168 grams of carbobenzoxyglycine hydrazide are dissolved in 15 cc. of glacial acetic acid and 1 gram of D-phenylalanine-N-carboxyanhydride is added. After 10 minutes, 1 cc. of trifluoroacetic acid is added and the mixture is evaporated in vacuo at 40° C. The oil remaining is dissolved in 20 cc. of chloroform. When the solution is allowed to stand, N-carbobenzoxyglycyl-N'-D-phenylalanyl-hydrizine trifluoroacetate crystallizes out. The yield is 92%.

(B) N-CARBOBENZOXYGLYCYL-N'-D-PHENYL-ALANYL-HYDRAZINE 1.452 mg. of trifluoroacetate are dissolved in 15 cc. of water and 3 cc. of 1-N-sodium hydroxide solution are added drop by drop. The precipitate formed is filtered off and dried under reduced pressure. 1.010 grams (91%) of N-carbobenzoxyglycyl-N'-D-phenylalanyl-hydrazine having a melting point of 135–136° C. are obtained. After recrystallization from water, the log-shaped crystals melt at 136.5° C.

(C) REARRANGEMENT 500 mg. of N-carbobenzoxyglycyl-N'-D-phenylalanyl-hydrazine are dissolved in 50 cc. of dioxane/glacial acetic acid (9:1) and the solution is allowed to stand for 14 hours at 38° C. or 2 hours at 60° C. and evaporated under reduced pressure at 40° C. After recrystallization from methanol/ether/petroleum ether (2:1:1), 450 mg. of carbobenzoxyglycyl-D-phenylalanyl hydrazide having a melting point of 109° C. are obtained.

EXAMPLE 4

*Carbobenzoxy-D-valyl-D-valine hydrazide*

(A) N-CARBOBENZOXY-D-VALYL-N'-D-VALYL-HYDRAZINE HYDROCHLORIDE 1.850 grams of carbobenzoxy-D-valine hydrazide are dissolved in 20 cc. of glacial acetic acid and 1 gram of D-valine-N-carboxyanhydride is added. Carbon dioxide is evolved immediately. After ½ hour, hydrogen chloride is introduced and dilution is carried out with 40 cc. of petroleum ether. The precipitate is filtered off and dried in vacuo over potassium hydroxide. 2.765 grams (98.7%) of the hydrochloride are obtained. After recrystallization from methanol/ether/petroleum ether (2:1:1), the N-carbobenzoxy-D-valyl-N'-D-valylhydrazine hydrochloride melts at 206° C.

(B) N-CARBOBENZOXY-D-VALYL-N'-D-VALYL-HYDRAZINE 2.005 grams of hydrochloride are dissolved in 30 cc. of water and 5 cc. of 1-N sodium hydroxide solution are added. A thick precipitate is produced which is filtered off, washed with water and dried in vacuo over phosphorus pentoxide. The yield is 1.72 grams (97%), F. 218°.

(C) REARRANGEMENT 200 mg. of the compound prepared under (B) are dissolved in 20 cc. of a mixture of glacial acetic acid/dioxane (1:9) and allowed to stand for 12 hours at 60° C. On evaporation, the carbobenzoxy-D-valyl-D-valine hydrazide is obtained in crystalline form and has a melting point of 210° C.

EXAMPLE 5

*Benzoylglycyl-D:L-phenylalanine hydrazide*

(A) N-BENZOYLGLYCYL-N'-D : L-PHENYLALANYL-HYDRAZINE TRIFLUORO-ACETATE 500 mg. of hippuric acid hydrazide are dissolved in 10 cc. of glacial acetic acid and 500 mg. of phenylalanine-N-carboxyanhydride in solid form are added. Carbon dioxide is evolved immediately. After 5 minutes, 0.5 cc. of trifluoroacetic acid is added and the solution is evaporated under reduced pressure at 40° C. The residue is crystallized from methanol/ether/petroleum ether (2:1:1). 1.175 grams of N-benzoylglycyl-N'-D:L-phenylalanyl-hydrazine trifluoroacetate having a melting point of 183–193° C. are obtained.

(B) N-BENZOYLGLYCYL-N'-D : L-PHENALANYL-HYDRAZINE 500 mg. N-benzoylglycyl-N'-D:L-phenylalanyl-hydrazine trifluoroacetate is suspended in 5 cc. of ethyl acetate and 0.16 cc. of triethylamine is added. The suspended substance is dissolved. After a short time, the N-benzoylglycyl-N'-D:L-phenylalanyl-hydrazine crystallizes out (355 mg.); M.P. 180° C.

(C) BENZOYLGYLCYL-D : L-PHENYLALANINE HYDRAZIDE 200 mg. of N-benzoylglycyl-N'-D:L-phenylalanyl-hydrazine are dissolved in 5 cc. of dimethyl formamide, 39 mg. of glacial acetic acid are added, the mixture is heated for one hour to 100° C. and the dimethyl formamide is evaporated in a high vacuum at about 40° C. The solid residue is recrystallized from 10 cc. of ethanol. Benzoylglycyl-D:L-phenylalanine-hydrazide having a melting point of 182–183° C. is obtained (yield 82%). Instead of glacial acetic acid, it is also possible to use 66.5 mg. of pivalic acid.

Benzoylglycyl-D:L-phenylalanine hydrazide is also produced when N-benzoylglycyl-N'-D:L-phenylalanyl-hydrazine is heated with 10 to 20 parts by weight of glacial acetic acid or phenol or chlorophenol (o, m, p) for a short time to 100–120° C.

In the same way, starting from hippuric acid hydrazide and D-phenylalanine-N-carboxyanhydride, benzoyl-glycyl-D-phenylalanine hydrazide having a melting point of 209–210° C. (from water) is obtained. The N-benzoylglycyl-N'-D-phenylalanyl-hydrazine trifluoroacetate obtainable as intermediate product melts at 175° C. and the free base at 158° C. $[\alpha]_D^{20} = -24.2°$ (c.=2 in methanol).

EXAMPLE 6

*L-valyl-L-valine hydrazide*

(A) N-L-VALYL-N'-L-VALYL-HYDRAZINE

To a solution of 1 equivalent of hydrazine hydrate in 50 parts by weight of glacial acetic acid there are added 2 equivalents of valine-N-carboxyanhydride and the mixture is allowed to stand in a water-jet pump vacuum until the evolution of carbon dioxide is terminated.

(B) REARRANGEMENT 9 parts by volume of dioxane are added to the above solution and the mixture is then kept for 14 hours at 60° C. Evaporation and crystallization from alcohol give L-valyl-L-valine hydrazide.

EXAMPLE 7

In a manner analogous to that described in Example 3, 4 or 5 starting from N-benzoyl-gylcine hydrazide and glycine - N-carboxyanhydride, N-benzoylglycyl-N'-glycyl-hydrazine, $H_2O$, melting at 162–163° C. (from water) is obtained; starting from N-benzoyl-glycine hydrazide and D-alanine-N-carboxyanhydride, N-benzoylglycyl-N'-D-alanyl-hydrazine trifluoracetate melting at 191° C. and the hydrobromide melting at 230–234° C. is obtained; starting from N - benzoylglycylglycine hydrazide and D:L-phenylalanine-carboxyanhydride, N-benzoylglycyl-glycyl-N'-D:L-phenylalanyl-hydrazine, 3 $H_2O$, melting at 150° C. is obtained; starting from N-carbobenzoxy-glycine hydrazide and glycine-N-carboxyanhydride, N-carbobenzoxy-glycyl-N'-glycyl-hydrazine, $H_2O$, melting at 146.5° C. (from water) is obtained; starting from N-carbobenzoxyglycine hydrazide and D:L-phenylalanine carboxyanhydride, N - carbobenzoxyglycyl - N' - D:L-phenylalanyl-hydrazine melting at 152° C. is obtained; starting from N-carbobenzoxy-glycine hydrazide and L-phenylalanine-carboxyanhydride, N-carbobenzoxy-glycyl-N'-L-phenylalanyl-hydrazine melting at 135.5° C. is obtained; starting from N-carbobenzoxy-glycine hydrazide and D-valine-carboxyanhydride, N-carbobenzoxy-glycyl-N'-D-valylhydrazine melting at 131° C. is obtained; starting from N-carbobenzoxy-glycine hydrazide and L-prolinecarboxyanhydride, N - carbobenzoxy - glycyl-N'-L-prolylhydrazine melting at 141–142° C. is obtained; starting from N-carbobenzoxyglycylglycine hydrazide and D:L - phenyl-alaninecarboxyanhydride, N - carbobenzoxyglycylglycyl - N'-D:L - phenylalanyl-hydrazine melting at 168° C. is obtained; starting from N-carbobenzoxy-glycylglycine hydrazide and D-phenylalanine-carboxyanhydride, N- carbobenzoxyglycylglycyl -N- D-phenylalanyl-hydrazine melting at 179–180° C. is obtained; starting from N-carbobenzoxy-L-valine hydrazide and glycinecarboxyanhydride, N-carbobenzoxy-L-valyl-N'-glycyl-hydrazine melting at 199–200° C. is obtained; starting from N-carbobenzoxy-L-valine hydrazide and O-acetyl-tyrosinecarboxyanhydride, N-carbobenzoxy - L - valyl - N' - (O - acetyl) - tryosyl - hydrazine $C_2H_5OH$ melting at 192–193° C. (from 50% ethanol) is obtained and from the latter by splitting off the acetyl group N-carbobenzoxy-L-valyl-N'-tyrosylhydrazine melting at 173–174° C.; starting from N-carbobenzoxy-L-phenylalanine hydrazide and D-valinecarboxyanhydride, N - carbobenzoxy - L - phenylalanyl-N'-D-valylhydrazine melting at 174–176° C. is obtained; starting from N-tosylglycine hydrazide and D-phenylalanine carboxyanhydride, N-tosyl-glycyl-N'-D-phenylalanylhydrazine melting at 100.5° C. is obtained; starting from N-tosyl-glycine-hydrazide and L-phenylalanine carboxyanhydride, N-tosyl-glycyl-N'-L-phenylalanylhydrazine melting at 101° C. is obtained; starting from N-tosyl-L-proline hydrazide and D-phenylalaninecarboxyanhydride, N-tosyl-L-prolyl-N'-D-phenylalanylhydrazine melting at 84° C. is obtained; starting from N-tosyl-glycine hydrazide and D-valine-carboxyanhydride, N-tosylglycyl-N'-D-valyl-hydrazine hydrochloride melting at 188° C. is obtained.

All the above compounds are rearranged to form the corresponding peptide hydrazides in the manner described in Examples 3, 4 or 5. The compounds obtained correspond to those mentioned in Example 1; some of the compounds were determined by chromatoplate.

EXAMPLE 8

A mixture of 2 grams of N-carbobenzoxy-glycyl-N'-D-phenylalanyl hydrazine in 20 cc. of dimethyl acetamide and 0.6 gram of anhydrous phosphoric acid is kept for one hour under nitrogen at 80° C., then filtered through a weakly basic anion exchange resin of the type of "Amberlite IR–4B" (trade name of Rohm and Haas), and the resulting carbobenzoxy-glycyl-D-phenylalanine hydrazide is isolated by evaporation at 50° C. under 0.01 mm. Hg pressure and crystallization from methanol; it melts at 143–144° C. after having sintered at 109° C. Yield: 90% of the theoretical.

When 0.3 or 0.2 gram of phosphoric acid is used, the reaction takes 1½ hours or 2 hours, respectively.

EXAMPLE 9

A mixture of 2 grams of N-carbobenzoxy-glycyl-glycyl-N'-DL-phenylalanyl hydrazine in 20 cc. of dimethyl formamide and 10 grams of phosphorylated cellulose (prepared by reacting cellulose with phosphorus oxychloride; the resulting acid cellulose phosphate absorbs per gram 0.7 milli-equivalents of lye, e.g. 28 mg. of sodium hydroxide) is heated with stirring for 4 hours at 100° C. under nitrogen. The batch is then filtered, expressed and the rearrangement product, carbobenzoxy-glycyl-glycyl-DL-phenylalanine hydrazide, is isolated by evaporation and crystallization from methane; it melts at 205–207° C. Yield: 80% of the theoretical.

The cellulose phosphate can be replaced by a synthetic ion exchanger containing phosphite groups, for example Duolite C–62.

EXAMPLE 10

A mixture of 2 grams of N-carbobenzoxy-D-valyl-N'-D-valyl hydrazine in 25 cc. of dimethyl acetamide and 1 gram of phosphoric acid monophenyl ester is heated for 10 hours at 80° C. under nitrogen, then worked up as described in Example 8 to give a 60% yield of pure carbobenzoxy-D-valyl-D-valine hydrazide melting at 214–215° C.

When 0.5 gram of phosphoric acid isopropyl ester is used as rearrangement catalyst, the yield amounts to 75%.

EXAMPLE 11

10 mg. of N-carbobenzoxy-glycyl-glycyl-N'-DL-phenylalanyl hydrazine are dissolved in 500 mg. of dimethylacetamide and heated to 100° C. in the presence of 2 mg. of phosphorous acid. The carbobenzoxy-glycyl-glycyl-DL-phenylalanine hydrazide formed by the rearrangement is identified by thin-layer chromatography on "Kieselgel G" (trade name of Merck; the product consists of silicagel and 5% of gypsum) in the system chloroform +methanol 5:2, the substance being rendered visible with Tollens' reagent; $Rf=0.54$. After one hour 50% of rearrangement product is formed, and after four hours 90%.

EXAMPLE 12

In a manner analogous to that of Example 11, ¼ mol of anhydrous sulfuric acid is reacted per mol of N-carbobenzoxy - glycyl - glycyl - N' - DL-phenylalanyl hydrazine. After two hours, 70% of rearrangement product is formed, and after four hours 80%.

EXAMPLE 13

2 grams of N-carbobenzoxy-glycyl-glycyl-N'-DL-phenylalanyl-hydrazine in 20 cc. of dimethyl formamide are mixed with 10 grams of powdered aluminium silicate (containing free silicic acid: $Al_2SiO_5$, $xSiO_2$, $xH_2O$) and the whole is stirred at 120° C. for 5 hours under nitrogen. The batch is filtered, the filtrate evaporated under a pressure of 0.01 mm. of mercury, and the residue recrystallized from methanol. The pure rearrangement product, carbobenzoxy-glycyl-glycyl-DL - phenylalanine hydrazide, melts at 205–207° C. Yield: 60%.

EXAMPLE 14

10 mg. of N-carbobenzoxy-glycyl-glycyl-N'-DL-phenylalanyl-hydrazine are dissolved in 0.5 ml. of dimethylacetamide, and the solution heated to 100° C. in the presence of 350 mg. of anhydrous, primary potassium phosphate. After 8 hours, 50% of carbobenzoxy-glycyl-glycyl-DL-phenylalanin hydrazide can be detected by means of thin layer chromatography, as in Example 11.

When under the same conditions, the rearrangement is made on "Kieselgel G" (Merck), there are obtained after 8 hours 30% of rearrangement product, or with 200 mg. of talc 15% of rearrangement product.

EXAMPLE 15

2 grams of N-carbobenzoxy-glycyl-N'-D-phenylalanyl-hydrazine in 20 cc. of dimethyl acetamide are mixed with 2 grams of carboxymethylcellulose and the whole is stirred under nitrogen for 4 hours at 60° C., then filtered, expressed and the rearrangement product (carbobenzoxy-glycyl-D-phenylalanine-hydrazide, melting at 143–144° C. after sintering at 109° C.) is obtained by evaporation (at 50° C. under 0.01 mm. Hg pressure) and crystallization from methanol. Yield: 75%.

EXAMPLE 16

2 grams of N-carbobenzoxy-D-valyl-N'-D-valyl-hydrazine in 25 cc. of dimethyl acetamide are mixed with 3 grams of a weakly acidic ion exchange resin of the type Amberlite IRC–50 or Amberlite CG–50 (type II), stirred under nitrogen for 20 hours at 100° C. and the whole is worked up as described in Example 15. Yield: 65% of pure carbobenzoxy-D-valyl-D-valine-hydrazide melting at 214–215° C.

EXAMPLE 17

A solution of 10 mg. of N-carbobenzoxy-glycyl-glycyl-N'-DL-phenylalanyl-hydrazine in 0.5 cc. of dimethyl acetamide is heated at 100° C. in the presence of the catalysts listed in the following table. The carbobenzoxy-glycyl-glycyl-DL-phenylalanine-hydrazide of melting point 205–207° C. is identified by thin-layer chromatography on "Kieselgel G" (trade name of Merck; the product consists of silicagel and 5% of gypsum) with the use of chloroform+methanol (5:2) as solvent, the substance being rendered visible with Tollens' reagent. Its R$f$ value is 0.54.

TABLE

| Catalysts | Rearrangement product in percent yield after— | | |
|---|---|---|---|
| | 2 hours | 4 hours | 8 hours |
| Amberlite CG:50, Type II, H-form, 100 mg | 70 | 100 | |
| Carboxymethyl cellulose H-form, Whatman Powder CM 70, 50 mg | 40 | 75 | 100 |
| Polyacrylic acid, 100 mg | | 50 | 75 |

What is claimed is:

1. Process for the manufacture of peptide hydrazides, their derivatives with protected functional groups and their acid addition salts, wherein an N-aminoacyl-N'-aminoacyl-hydrazine of the formula

Z—NH—R''—CO—NH—NH—CO—R'—NH$_2$ in which R' and R'' represent a residue of a naturally occurring α-amino acid from which the carboxy group and the amino group have been split off, and Z stands for a member selected from the group consisting of (1) hydrogen, (2) an amino protective group and (3) an aminoacyl radical Z'—NH—R'—CO— in which Z' is a member selected from the group consisting of hydrogen and an amino protective group and R' is the same as defined above is rearranged by means of an organic acid in the presence of an inert organic solvent.

2. Process as claimed in claim 1, wherein an α-amino acid hydrazide is treated with an α-amino acid-N-carboxyanhydride of the formula

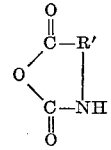

in which R' has the given meaning to form an N-α-aminoacyl-N'-α-amino-acyl-hydrazine and the latter is rearranged to form a peptide hydrazide with an organic acid in the presence of an inert organic solvent.

3. Process as claimed in claim 1, wherein further functional groups in the N-α-aminoacyl-N'-α-aminoacyl hydrazine starting material are protected and the protecting groups removed after the rearrangement reaction.

4. Process as claimed in claim 2, wherein further functional groups in the N-α-aminoacyl-N'-α-aminoacyl hydrazine starting material are protected and the protecting groups removed after the rearrangement reaction.

5. Process as claimed in claim 1, wherein the rearrangement of the hydrazine derivative is effected by means of a carboxylic acid having a pK greater than 2.

6. Process as claimed in claim 1, wherein the rearrangement of the hydrazine derivative is effected by means of an inorganic oxygen acid.

7. Process as claimed in claim 1, wherein the rearrangement of the hydrazine derivative is effected by means of an inorganic oxygen acid deriving from phosphor.

8. Process as claimed in claim 1, wherein the rearrangement of the hydrazine derivative is effected by means of an acid salt of an inorganic oxygen acid.

9. Process as claimed in claim 1, wherein the rearrangement of the hydrazine derivative is effected by means of an acid ester of phosphoric acid.

10. Process as claimed in claim 1, wherein the rearrangement of the hydrazine derivative is effected by means of acid cellulose phosphate.

11. Process as claimed in claim 1, wherein the rearrangement of the hydrazine derivative is effected by means of a polycondensate containing acid groups.

12. Process as claimed in claim 1, wherein the rearrangement of the hydrazine derivative is effected by means of a ion exchanger containing carboxyl groups.

13. Process as claimed in claim 1, wherein the rearrangement of the hydrazine derivative to form the peptide hydrazide is effected by means of a member selected from the group consisting of glacial acetic acid, propionic acid and pivalic acid.

14. Process as claimed in claim 1, wherein a member selected from the group consisting of dimethylacetamide, tetramethyl-urea, tetrahydrofuran, dioxane, dimethoxyethane, carbonic acid diethyl ester and pyridine is used as organic solvent.

References Cited by the Examiner

UNITED STATES PATENTS 2,746,968   5/1956   Hegedus.

LEWIS GOTTS, *Primary Examiner.*

P. A. STITH, *Assistant Examiner.*